United States Patent Office 3,515,018
Patented June 2, 1970

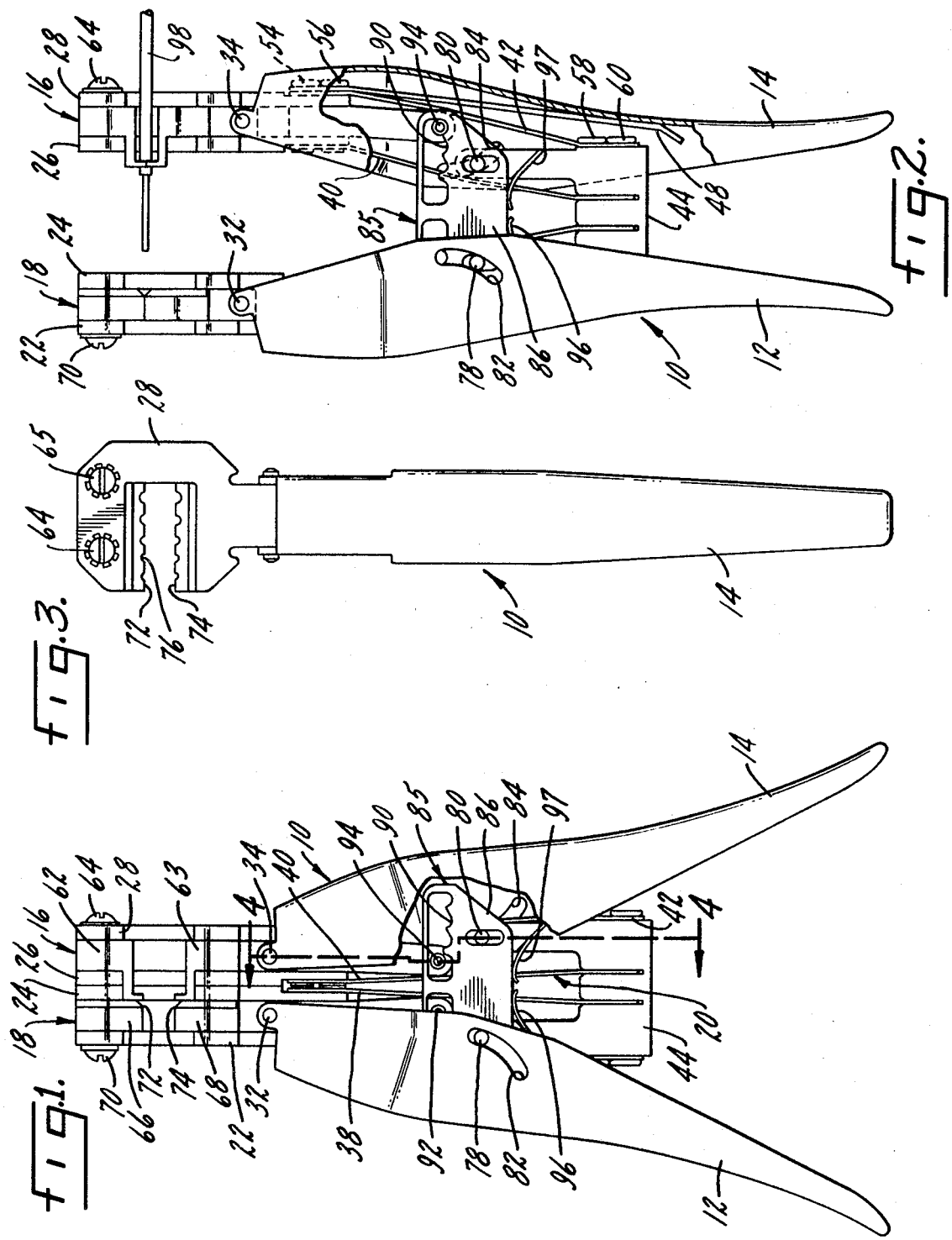

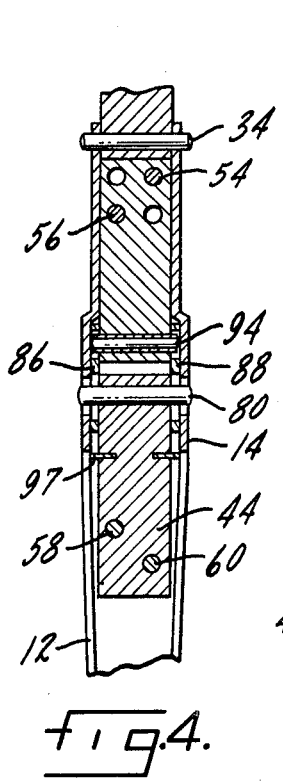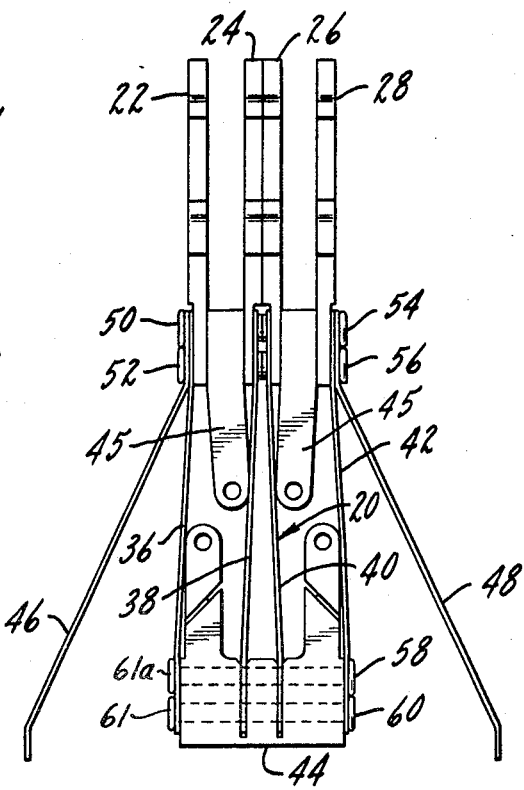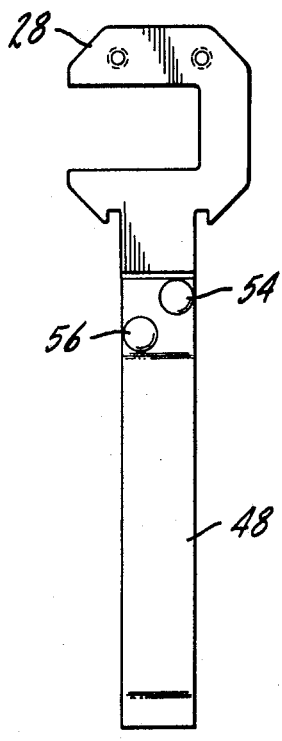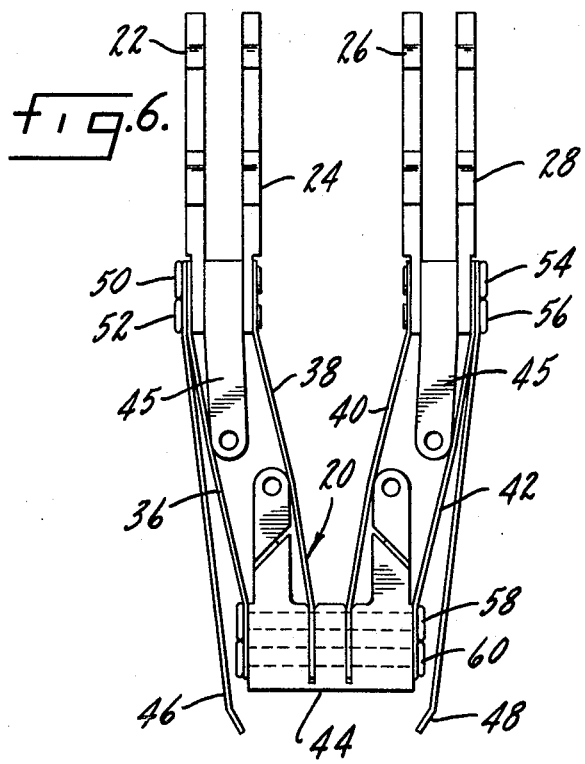
INVENTOR.
Irving R. Metcalf,
BY Parker & Carter
Attorneys.

3,515,018
DEVICE FOR STRIPPING WIRES
Irving R. Metcalf, St. Charles, Ill., assignor to Ideal Industries, Inc., Sycamore, Ill., a corporation of Delaware
Filed Dec. 4, 1967, Ser. No. 687,824
Int. Cl. H02g 1/12
U.S. Cl. 81—9.5
12 Claims

ABSTRACT OF THE DISCLOSURE

A device for stripping insulation from wire having a pair of interconnected handle members with operable elements including flexural means and paired sets of gripping and cutting jaws with each set of jaws being opposed to each other and movable to define an opening and closing action. In addition, one set of paired jaws is separable from the other set of paired jaws describing a parallel motion when separated.

This invention relates to a device for stripping wires and, more particularly, to a device or tool for severing and stripping insulation or like covering from electric wires or similar elements.

Accordingly, a primary object of this invention is a tool or device having jaws which remain parallel to themselves and to each other as they move apart thereby eliminating or minimizing dragging and scrapping of the wires as the insulation is removed.

A further object of this invention is an improved tool or device having two coacting jaws which engage the wire, cut the insulation, and present the same angle or aspect towards the wire while removing the severed segment of insulation.

Another object is an inexpensive hand stripper with improved structure which eliminates friction and wear between interconnecting parts.

Another object is an accurate wire stripping tool with means to preserve parallelism between the pairs of jaws as they move apart.

Other objects and advantages will appear from time to time in the ensuing specification and drawings in which:

FIG. 1 is a plan view of the wire stripper with parts removed for clarity;

FIG. 2 is another plan view with parts removed showing the device fully actuated;

FIG. 3 is a side view of the device shown in FIG. 1;

FIG. 4 is a section view taken along line 4—4 of FIG. 1;

FIG. 5 is a plan view of the spring/guide plate assembly for this invention;

FIG. 6 is another plan view of the assembly shown in FIG. 5 fully actuated, and

FIG. 7 is a side view of the assembly shown in FIG. 5.

Referring to the drawings in more detail it will be seen that this invention consists of improvements in a device for stripping wires. The wire stripper 10 includes a pair of interconnected handle members or levers 12 and 14 having operable elements including flexural means 20 actuated by relative movement of the handle members. The device also includes paired sets of gripping jaws 16 and cutting jaws 18 with each set of jaws being movable to define an opening and closing action. In addition, one set of jaws 16 is separable from the other set of jaws 18 describing a parallel motion when separated.

More specifically, the device for stripping wires preferably includes two pairs of guide plates 22, 24 and 26, 28 which are attached to the upper ends of the flexural or spring means 20. The guide plates are maintained in spaced relation by the gripping and cutting jaws 16 and 18 positioned therebetween and by the spacer blocks as indicated at 45. In addition, pins 32, 34 serve as pivots for the handle members 12 and 14.

The flexural means 20 preferably consists of two pairs of substantially parallel leaf springs 36, 38 and 40, 42 mounted within a common anchor 44 so that movement between the paired sets of jaws and the anchor is permitted only by flexure of the springs. The upper ends of the springs 36, 38 and 40, 42 are attached respectively to the two pairs of guide plates 22, 24 and 26, 28.

Each handle member 12 and 14 preferably includes a handle spring 46 and 48 connected to the flexural means 20 and attached at their respective upper ends to guide plates 22 and 28. Rivets shown at 50, 52, 54, 56, 58, 60, 61 and 61a locate and fasten the aggregate parts together.

It should be noted that each pair of guide plates 22, 24 and 26, 28 forms a passageway for the paired sets of gripping jaws 16 and cutting jaws 18. The gripping jaws 16 engage the wire 98 and retain it during the stripping operation while the cutting jaws 18 incise the insulation and remove the severed segment of insulation as the pairs of jaws separate. The gripping jaws 16 are carried between plates 26 and 28 and are mounted directly above handle member 14. The cutting jaws 18 are carried between plates 22 and 24 and are mounted directly above the other handle member 12.

As best shown in FIGS. 1 and 2, the upper gripping jaw 62 may be secured to guide plates 26 and 28 by screws 64, 65. The opposed gripping jaw 63 is movable, and slides up and down within the passageway when actuated by the handle member 14. The gripping jaws have cross-hatched, serrated or otherwise broken faces to provide a good gripping surface.

The cutting jaws 18 are also shown having an upper fixed jaw 66 which may be secured to guide plates 22 and 24 by screws 70, only one of which is shown. In addition, a movable cutting jaw 68 opposes the fixed cutting jaw 66, and slides within its respective passageway. The cutting jaws preferably include knives or blades 72 and 74 for cutting through the insulation on the wire 98. As shown in FIG. 3, the cutting jaws 18 have matching notches 76 in the upper and lower blades which meet to form circular cutting surfaces.

The gripping and cutting jaws have been shown and described as having an upper fixed jaw with a lower movable jaw. However, it is important to note that this arrangement may be reversed with the upper jaws movable and the lower jaws fixed.

The handle members 12 and 14 have two pins 78 and 80 inserted or captive in the block 44 which engage suitable openings to affect movement of the gripping jaws 16 and cutting jaws 18. As shown in FIGS. 1 and 2, the handle members have arcuate cam slots 82, 84 which also engage the pins 78, 80. Movement of the handle members 12 and 14 towards each other results in an upward movement of the handle members on the pins 78, 80 thereby causing the movable gripping and cutting jaws to move upward into engagement with the insulated wire 98.

As soon as the movable gripping jaws 16 and cutting jaws 18 have fully engaged the insulated wire 98, further upward motion of the handle members 12 and 14 is inhibited, and continued pressure on the handle members causes each set of jaws to separate from each other. This separation defines a parallel motion and is permitted by the constraining flexural means 20.

It is important to note that the paired jaws 16 and 18 are free to separate under the constraint imposed by the flexural means 20. As mentioned, this constraint allows parallel separation of one set of jaws 16 from the other set of jaws 18 when actuated by the handle members 12 and 14. In this manner the blades 72, 74 in the cutting jaws 18 present the same angle or aspect towards the wire 98 throughout separation. This accomplishes the very important result of eliminating or minimizing dragging and scrapping of the wire while the insulation is removed.

In addition, a latch means or mechanism 85 may be provided to hold the paired jaws 16 and 18 in a separated position until the stripped wire has been released by the cutting jaws. As shown in FIGS. 1, 2 and 4, the latch mechanism 85 may include two parallely mounted plates 86 and 88 having two openings with a plurality of notches 90 for receiving latch pins 92 and 94 to hold the paired jaws temporarily in a separated position. The latch mechanism 85 also includes a pair of springs 96, 97 urging the mechanism into latching position and further includes a means for releasing the latch mechanism in response to return movement of the handle members 12 and 14.

It is important to remember that a given stripping operation may require that a predetermined length of insulation cover be removed from the wire or electrical conductor. If, for example, only a small length of insulation cover is to be removed in a given series of stripping operations, then it is only necessary that the separable jaws 16 and 18 move apart a limited degree. Accordingly, the latch pins 92 and 94 are placed in an appropriate notch so that the extreme separation of the jaws is appropriately limited.

The use, operation and function of this invention are as follows:

Since both the closing of the paired sets of jaws 16 and 18 upon the wire 98 and separation of the jaws from each other are accomplished by movement of the handle members 12 and 14, some means must be provided to insure that this action occurs in the proper sequence. Thus, as the handle members 12 and 14 are forced towards each other, the cutting jaws 18 and gripping jaws 16 should be constrained to close before each set of jaws separate from each other. As the handle members 12 and 14 are released, however, opening of the cutting jaws 18 must precede return movement of the jaws 16 and 18 to their original position. The means used to insure this sequence may be coacting parts or in some cases dimensions and locations of parts may be adjusted to achieve this result. In the wire stripper shown the means used are notches 90 with coacting pin 94. It should also be understood that the means employed may be friction surfaces arranged to develop hold open forces on the paired jaws during return movement of the handle members 12 and 14, thereby insuring opening of the cutting jaws 18 followed by a friction release when the handle members have approached their furthest open position.

Referring more specifically to the figures, the wire to be stripped is first laid between the upper and lower pairs of gripping and cutting jaws 16 and 18, and may be seated in the cutting notch 76 which best suits the size of the wire. The handle members 12 and 14 which are normally held apart by springs 46 and 48 are then squeezed together. As shown in FIGURE 2 squeezing the handle members 12 and 14 moves them toward each other, and this action initially causes the movable gripping jaw 63 to grasp the wire 98 and the movable cutting jaw 68 to incise the insulation cover.

In the embodiment shown in the figures the movable jaws move upward due to the upward movement of the handle members 12 and 14. The upward movement of the handle members is due to the thrust of pins 78, 80 on the inclined sides of cam slots 82, 84. It is important to note that the upper ends of the handle members are prevented from swinging outwardly by reason of the jaws 16 and 18 bearing against the guide plates 22, 24 and 26, 28, while the plates are prevented from swinging outwardly by flexural forces in the spring assembly.

Further movement of the handle members 12 and 14 toward each other causes each pair of jaws 16 and 18 to move apart in parallel motion, thus stripping the severed portion of insulation from the wire 98. It is important to note that the constraint imposed by the flexural means 20 keeps each pair of jaws 16 and 18 parallel throughout this separation. In this way the blades 72, 74 are caused to move along the wire 98 so as to present the same angle or aspect toward the wire thereby eliminating or minimizing dragging the scrapping of the wire by the blades.

As soon as the severed portion of insulation has been removed from the wire 98 the jaws 16 and 18 may be held in a separated position by a latch mechanism 85. The latch mechanism allows the stripped wire to be removed from the device without scrapping or crushing the wire 98 when returning the handle members 12 and 14 to their original inoperative position.

It is understood that this invention is not confined to the particular construction and arrangement of parts herein illustrated and described. More particularly, it should be understood that although this invention has been illustrated and described as a hand tool, the principles and structure should not be confined or restricted to hand tools, and may apply as well to bench strippers or any other type of stripping mechanism that may come within the scope of the following claims.

I claim:

1. A device for stripping insulation from wire including:
    paired sets of gripping and cutting jaws opposed to each other and movable to define an opening and closing action,
    one set of paired jaws being movable so as to be separable from the other set of paired jaws,
    connecting means between the operable elements of said device including flexural means to cause said paired jaws to describe a parallel motion when separated, and
    means to actuate movement and separation of each set of paired gripping and cutting jaws.

2. The structure of claim 1 further characterized in that the flexural means include at least one leaf spring.

3. The structure of claim 1 further characterized by a plurality of guide plates maintained in spaced relation, and further said flexural means are attached at one end to the guide plates and fastened at the other end to a common anchor thereby allowing the cutting jaws to move along the wire so as to present the same angle towards the wire throughout its movement.

4. The structure of claim 1 further including a plurality of guide plates for receiving the paired sets of gripping and cutting jaws, said gripping and cutting jaws each consisting of a fixed element mounted between said guide plates and a cooperating movable element slidably mounted between said guide plates.

5. The structure of claim 4 further characterized in that the paired sets of gripping and cutting jaws are secured between the guide plates, and said guide plates are connected with the flexural means which in turn are actuated by the means to actuate movement and separation allowing said jaws to remain parallel to one another while spreading apart.

6. The structure of claim 1 further characterized in that the means to actuate movement and separation slidably engage the paired sets of gripping and cutting jaws, and are adapted to close said jaws in response to a squeezing force applied to said means.

7. The structure of claim 1 further characterized in that the means to actuate movement and separation are adapted to cooperate with the gripping and cutting jaws so that when said means are actuated, said jaws will close and upon further actuation the gripping jaws will separate from the cutting jaws describing a parallel motion.

8. The structure of claim 1 further characterized in that the means to actuate movement and separation includes a pair of interconnected handle members each having a handle spring connected to the flexural means and further said flexural means consists of at least two pairs of leaf springs mounted within an anchor and adapted to be actuated by the handle members thereby separating the cutting jaws from the gripping jaws in a parallel motion.

9. The structure of claim 8 further characterized in that the handle members are formed with cam slots therein with each cam slot adapted to receive a pin thereby guiding said handle members in an upward movement when subjected to a squeezing force, and further including means coupling the upward motion of the handle members to the paired jaws thereby causing the jaws to close and engage the wire therebetween.

10. The structure of claim 1 further characterized and including latch means for holding said paired jaws in a separated position until the stripped wire has been removed.

11. The structure of claim 1 further characterized by a latch mechanism constructed to hold the paired jaws temporarily apart including a spring means urging said latch mechanism into latching position thereby restraining the paired jaws from movement towards each other until the paired sets have each opened to release the wire, and further including means for releasing said latch mechanism thus permitting return movement of the paired jaws to their unseparated position.

12. The structure of claim 1 further characterized by a latch mechanism including at least one mounted plate member having at least one opening with a plurality of notches for reeciving a latch pin to hold said paired jaws temporarily in a separated position.

References Cited

UNITED STATES PATENTS

| | | | |
|---|---|---|---|
| 2,770,154 | 11/1956 | Schinske | 81—9.5 |
| 3,146,645 | 9/1964 | Hindenburg et al. | 81—9.5 |
| 3,139,778 | 7/1964 | Bielinski et al. | 81—9.5 X |
| 3,226,815 | 1/1966 | Kelly | 81—9.5 X |

ROBERT C. RIORDON, Primary Examiner

R. V. PARKER, Jr., Assistant Examiner